United States Patent
Jeong et al.

(10) Patent No.: US 9,854,229 B2
(45) Date of Patent: Dec. 26, 2017

(54) THREE-DIMENSIONAL IMAGE PROCESSING APPARATUS AND METHOD FOR ADJUSTING LOCATION OF SWEET SPOT FOR DISPLAYING MULTI-VIEW IMAGE

(71) Applicant: LG ELECTRONICS INC., Seoul (KR)

(72) Inventors: Dongman Jeong, Seoul (KR); Taesoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 13/793,509

(22) Filed: Mar. 11, 2013

(65) Prior Publication Data

US 2013/0242067 A1    Sep. 19, 2013

(30) Foreign Application Priority Data

Mar. 19, 2012 (KR) .................. 10-2012-0027574

(51) Int. Cl.
H04N 13/04 (2006.01)
(52) U.S. Cl.
CPC ....... *H04N 13/047* (2013.01); *H04N 13/0402* (2013.01); *H04N 13/0445* (2013.01); *H04N 13/0477* (2013.01)
(58) Field of Classification Search
CPC .................. H04N 13/047; H04N 13/0477
See application file for complete search history.

(56) References Cited

U.S. PATENT DOCUMENTS

| 5,777,720 A * | 7/1998 | Shapiro .............. G02B 27/0093 348/E13.022 |
| 2003/0025995 A1* | 2/2003 | Redert et al. ................. 359/464 |

(Continued)

FOREIGN PATENT DOCUMENTS

| CN | 1894976 A | 1/2007 |
| CN | 102300110 A | 12/2011 |

(Continued)

OTHER PUBLICATIONS

Chinese Office Action and Search Report dated Oct. 16, 2014 issued in Application No. 201310088265.7 (Original Office Action, Search Report, and English Translation).

(Continued)

*Primary Examiner* — Jay Patel
*Assistant Examiner* — Shadan E Haghani
(74) *Attorney, Agent, or Firm* — KED & Associates, LLP

(57) ABSTRACT

A three-dimensional image processing apparatus and a method for controlling a location of a sweet spot for displaying a multi-view image are disclosed. A receiver receives a multi-view image including a plurality of view images. A controller detects a plurality of users from an image obtained by taking a watching zone, acquires user location information indicating locations of the plurality of detected users, calculates distance information indicating a distance between the detected users by using the acquired user location information, and controls a location of a sweet spot for viewing the plurality of view images on the basis of the calculated distance information and a length of a dead zone of the multi-view image.

20 Claims, 24 Drawing Sheets

(56) References Cited

U.S. PATENT DOCUMENTS

| | | | | |
|---|---|---|---|---|
| 2006/0215018 A1* | 9/2006 | Fukushima | ........ | G02B 27/2214 |
| | | | | 348/51 |
| 2007/0018585 A1* | 1/2007 | Ijzerman | ................. | G09F 19/14 |
| | | | | 315/15 |
| 2010/0002006 A1* | 1/2010 | Mauchly | ............ | H04N 13/0497 |
| | | | | 345/581 |
| 2010/0315492 A1* | 12/2010 | Baik | .................. | H04N 5/23219 |
| | | | | 348/51 |
| 2011/0032339 A1* | 2/2011 | Hirayama | .......... | H04N 13/0011 |
| | | | | 348/51 |
| 2011/0316881 A1* | 12/2011 | Yoshifuji | ........... | H04N 13/0409 |
| | | | | 345/634 |
| 2013/0027772 A1* | 1/2013 | Large | ........................... | 359/464 |

FOREIGN PATENT DOCUMENTS

| | | | | |
|---|---|---|---|---|
| CN | 102348124 A | | 2/2012 | |
| EP | 2 413 610 | | 2/2012 | |
| GB | 2 329 545 | | 3/1999 | |
| WO | WO03/013153 | * | 2/2003 | ............. H04N 13/00 |
| WO | WO 2005/060270 | | 6/2005 | |

OTHER PUBLICATIONS

European Search Report for Application No. 13001223.0, dated May 28, 2013.

\* cited by examiner

| B | R | G | B | R | G | B | R | G | B |
|---|---|---|---|---|---|---|---|---|---|
| 1 | 6 | 11 | 16 | 21 | 26 | 31 | 36 | 1 | 6 |
| B | R | G | B | R | G | B | R | G | B |
| 7 | 12 | 17 | 22 | 27 | 32 | 37 | 2 | 7 | 12 |
| B | R | G | B | R | G | B | R | G | B |
| 13 | 18 | 23 | 28 | 33 | 38 | 3 | 8 | 13 | 18 |
| B | R | G | B | R | G | B | R | G | B |
| 19 | 24 | 29 | 34 | 39 | 4 | 9 | 14 | 19 | 24 |
| B | R | G | B | R | G | B | R | G | B |
| 25 | 30 | 35 | 40 | 5 | 10 | 15 | 20 | 25 | 30 |
| B | R | G | B | R | G | B | R | G | B |
| 31 | 36 | 1 | 6 | 11 | 16 | 21 | 26 | 31 | 36 |
| B | R | G | B | R | G | B | R | G | B |
| 37 | 2 | 7 | 12 | 17 | 22 | 27 | 32 | 37 | 2 |

| B | R | G | B | R | G | B | R | G | B |
|---|---|---|---|---|---|---|---|---|---|
| 5 | 10 | 15 | 20 | 25 | 30 | 35 | 40 | 5 | 10 |
| B | R | G | B | R | G | B | R | G | B |
| 11 | 16 | 21 | 26 | 31 | 36 | 1 | 6 | 11 | 16 |
| B | R | G | B | R | G | B | R | G | B |
| 17 | 22 | 27 | 32 | 37 | 2 | 7 | 12 | 17 | 22 |
| B | R | G | B | R | G | B | R | G | B |
| 23 | 28 | 33 | 38 | 3 | 8 | 13 | 18 | 23 | 28 |
| B | R | G | B | R | G | B | R | G | B |
| 29 | 34 | 39 | 4 | 9 | 14 | 19 | 24 | 29 | 34 |
| B | R | G | B | R | G | B | R | G | B |
| 35 | 40 | 5 | 10 | 15 | 20 | 25 | 30 | 35 | 40 |
| B | R | G | B | R | G | B | R | G | B |
| 1 | 6 | 11 | 16 | 21 | 26 | 31 | 36 | 1 | 6 |

FIG. 13

| | 1310 | | | | | | | | | |
|---|---|---|---|---|---|---|---|---|---|---|
| | B | R | G | B | R | G | B | R | G | B |
| | 0 | 05 | 10 | 15 | 20 | 25 | 30 | 35 | 40 | 05 |
| | 1.0 | .99 | .98 | .97 | .96 | .95 | .94 | .93 | .92 | .91 | 1320
| | B | R | G | B | R | G | B | R | G | B |
| | 06.99 | 11 | 16 | 21 | 26 | 31 | 36 | 01 | 06 | 11 |
| | 9 | .98 | .97 | .96 | .95 | .94 | .93 | .92 | .91 | .90 |
| | B | R | G | B | R | G | B | R | G | B |
| | 12.98 | 17 | 22 | 27 | 32 | 37 | 02 | 07 | 12 | 17 |
| | | .97 | .96 | .95 | .94 | .93 | .92 | .91 | .90 | .89 |
| | B | R | G | B | R | G | B | R | G | B |
| | 18.96 | 23 | 28 | 33 | 38 | 03 | 08 | 13 | 18 | 23 |
| | | .95 | .94 | .93 | .92 | .91 | .90 | .89 | .88 | .87 |
| | B | R | G | B | R | G | B | R | G | B |
| | 24.95 | 29 | 34 | 39 | 04 | 09 | 14 | 19 | 24 | 29 |
| | | .94 | .93 | .92 | .91 | .90 | .89 | .88 | .87 | .86 |
| | B | R | G | B | R | G | B | R | G | B |
| | 30.94 | 35 | 40 | 05 | 10 | 15 | 20 | 25 | 30 | 35 |
| | | .93 | .92 | .91 | .90 | .89 | .88 | .87 | .86 | .85 |
| | B | R | G | B | R | G | B | R | G | B |
| | 36.93 | 01 | 06 | 11 | 16 | 21 | 26 | 31 | 36 | 01 |
| | | .92 | .91 | .90 | .89 | .88 | .87 | .86 | .85 | .84 |

1300

THREE-DIMENSIONAL IMAGE PROCESSING APPARATUS AND METHOD FOR ADJUSTING LOCATION OF SWEET SPOT FOR DISPLAYING MULTI-VIEW IMAGE

This application claims the benefit of the Korean Patent Application No. 10-2012-0027574, filed on Mar. 19, 2012, which is hereby incorporated by reference as if fully set forth herein.

BACKGROUND OF THE INVENTION

Field of the Invention

The present invention relates to an apparatus for processing a three-dimensional image and a method for controlling a location of a sweet spot for displaying a three-dimensional image, and more particularly, to a three-dimensional image processing apparatus to display a multi-view image and a method for controlling a location of a sweet spot for displaying a multi-view image.

Discussion of the Related Art

Recently, the display technology of displaying a three-dimensional image has been studied and used in various fields. Particularly, an electronic device that displays a three-dimensional image by using the display technology of displaying a three-dimensional image has received much attention.

The technology of displaying a three-dimensional image is based on the principle of binocular disparity, in which an observer feels a three-dimensional effect in accordance with parallax of both eyes. The technology of displaying a three-dimensional image is divided into a shutter glass method, a glassless method, and a full three-dimensional method. The shutter glass method has a problem in that a user should wear a separate equipment such as glasses. The glassless method has a problem in that a user can view a three-dimensional image at a specific location only.

SUMMARY OF THE INVENTION

Accordingly, the present disclosure is directed to a three-dimensional image processing apparatus and a method for controlling a location of a sweet spot for displaying a multi-view image, which substantially obviate one or more problems due to limitations and disadvantages of the related art.

An object of the present disclosure is to provide a three-dimensional image processing apparatus and a method for controlling a location of a sweet spot for displaying a multi-view image, in which a sweet spot zone may be controlled in accordance with locations of a plurality of users who watch three-dimensional images displayed in accordance with a glassless method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a location of a sweet spot for displaying a multi-view image including a plurality of view images comprises the steps of detecting a plurality of users from an image obtained by taking a watching zone and acquiring user location information indicating locations of the plurality of detected users; calculating distance information indicating a distance between the detected users by using the acquired user location information; and controlling the location of the sweet spot on the basis of the calculated distance information and a length of a dead zone of the multi-view image.

The step of controlling the location of the sweet spot includes controlling arrangement of the plurality of view images on the basis of the distance information and the length of the dead zone of the multi-view image.

The step of controlling the location of the sweet spot includes calculating a three-dimensional image pixel period on the basis of the distance information and the length of the dead zone of the multi-view image, and controlling arrangement of the plurality of view images on the basis of the calculated three-dimensional image pixel period.

The step of controlling the location of the sweet spot includes calculating interval information indicating an interval between a display panel and a filter on the basis of the distance information and the length of the dead zone of the multi-view image, and controlling the interval between the display panel and the filter on the basis of the calculated interval information.

The step of controlling the location of the sweet spot includes controlling at least one of a location of a lens and a barrier of a filter on the basis of the distance information and the length of the dead zone of the multi-view image.

The step of controlling the location of the sweet spot may further include the steps of arranging the dead zone of the multi-view image between the plurality of users if the distance between the plurality of users is greater than the length of the dead zone of the multi-view image.

The step of controlling the location of the sweet spot may further include the step of arranging the plurality of users at the same sweet spot if the distance between the plurality of users is smaller than the length of the dead zone of the multi-view image.

The step of calculating the distance information includes, if the distance between the plurality of users is greater than a viewing zone, moving at least one of the plurality of users so that the distance between the plurality of users is smaller than the viewing zone, and calculating distance information indicating a distance between the moved at least one user and the other user.

In another aspect of the present invention, a three-dimensional image processing apparatus includes a receiver for receiving a multi-view image including a plurality of view images, and a controller for detecting a plurality of users from an image obtained by taking a watching zone, acquiring user location information indicating locations of the plurality of detected users, calculating distance information indicating a distance between the detected users by using the acquired user location information, and controlling a location of a sweet spot for viewing the plurality of view images on the basis of the calculated distance information and a length of a dead zone of the multi-view image.

The apparatus further comprises a display module for displaying the view images arranged under the control of the controller. The display module includes a display panel for displaying the view images, and a filter for controlling an optical path of the displayed view images.

The controller calculates the distance information of the plurality of users after moving actual locations of the plurality of users as much as an integer multiple of a width of a viewing zone to reach the inside of one viewing zone.

The controller may control the location of the sweet spot by controlling arrangement of the plurality of view images on the basis of the distance information and the length of the dead zone of the multi-view image.

The controller may control the location of the sweet spot by calculating a three-dimensional image pixel period on the basis of the distance information and the length of the dead zone of the multi-view image and controlling arrangement of the plurality of view images on the basis of the calculated three-dimensional image pixel period.

The controller may control the location of the sweet spot by calculating interval information indicating an interval between a display panel and a filter on the basis of the distance information and the length of the dead zone of the multi-view image and controlling the interval between the display panel and the filter on the basis of the calculated interval information.

The controller may control the location of the sweet spot by controlling at least one of a location of a lens or a barrier of a filter on the basis of the distance information and the length of the dead zone of the multi-view image.

The controller may control the dead zone of the multi-view image to be located between the users if the distance between the plurality of users is greater than the length of the dead zone of the multi-view image.

The controller may control the plurality of users to be located at the same sweet spot if the distance between the plurality of users is smaller than the length of the dead zone of the multi-view image.

If the distance between the plurality of users is greater than a viewing zone, the controller may move at least one of the plurality of users so that the distance between the plurality of users is smaller than the viewing zone, and may calculate distance information indicating a distance between the moved at least one user and the other user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram illustrating an example of a view table according to the present invention;

FIG. 10 is a diagram illustrating another example of a view table according to the present invention;

FIG. 13 is a diagram illustrating further still another example of a view table according to the present invention;

DETAILED DESCRIPTION OF THE INVENTION

Figure 1:
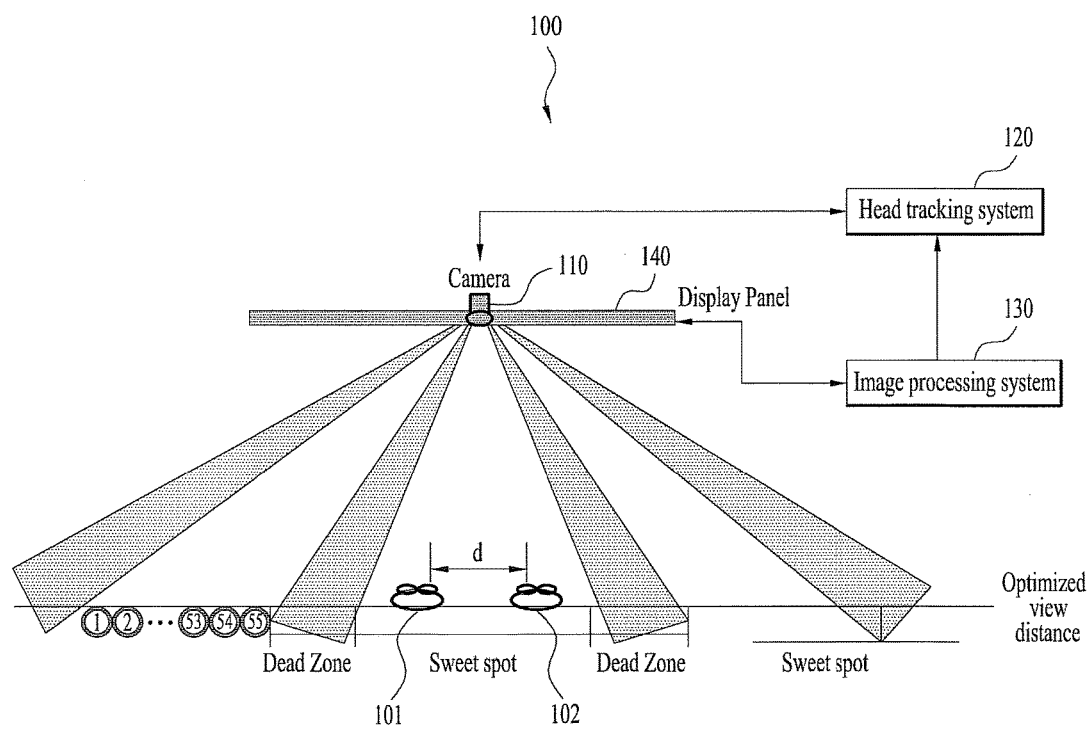
FIG. 1 is a schematic diagram illustrating an image system according to the preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. The embodiments of the present invention shown in the accompanying drawings and described by the drawings are only exemplary, and technical spirits of the present invention and its main operation are not limited by such embodiments.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Also, specific structural or functional descriptions of the embodiments according to the present invention, which are disclosed in this disclosure, are intended to describe the embodiments of the present invention, and various modifications may be made in the embodiments of the present invention. It is not to be understood that the present invention is limited to the embodiments described in this disclosure.

Since various modifications may be made in the embodiments according to the present invention, specific embodiments will be illustrated in the drawings and will be described in detail in this disclosure. However, it is to be understood that the embodiments according to the present invention are not limited to a specific disclosure and include all modifications, equivalents or replacements included in technical spirits and technical scope of the present invention.

And, although the terms indicating the ordinal number such as first and/or second may be used to describe various elements, the elements should not be restricted by the terms. The terms are used to identify one element from another element. For example, the first element may be referred to as the second element and vice versa within the scope of the present invention.

In this disclosure, when some part "includes" some elements, it means that the part may further include other elements unless mentioned to the contrary. Also, terminologies " . . . part," " . . . block," and " . . . module" mentioned in this disclosure mean a unit processing at least one function or operation, and may be implemented by hardware, software or combination of hardware and software.

FIG. 1 is a schematic diagram illustrating an image system according to the preferred embodiment of the present invention.

Referring to FIG. 1, an image system 100 according to the present invention may include at least one of a camera 110, a head tracking system 120, an image processing system 130 and a display panel 140. The image processing system 130 may be a multi-view system that may provide a plurality of users with a three-dimensional image. Whenever locations of users 101 and 102 in a viewing zone are moved, the image system 100 provides left eyes and right eyes of the users with two view images corresponding to the moved locations, whereby the users may feel a three-dimensional effect through the two view images.

The viewing zone may include a sweet spot and a dead zone. The sweet spot means a zone that a left eye view image is viewed by a left eye and a right eye view image is viewed by a right eye to allow a three-dimensional image to be viewed normally. The dead zone means a zone that an image other than a left eye view image is viewed by a left eye and an image other than a right eye view image is viewed by a right eye to allow a double image to be viewed.

According to one embodiment, the image system may be configured as a multi-view system that provides a viewing zone of 80 cm with 55 view images. The image system 100 may be configured as a multi-view system that provides a viewing zone of 80 cm with 44 view images.

The camera 110 takes a watching zone. The watching zone includes a viewing zone, and means a periphery zone of the display panel 140. The camera 110 may take a plurality of users located in the watching zone. The camera 110 outputs the taken image of the watching zone to a head tracking system 120.

The head tracking system 120 detects a plurality of users from the image output from the camera 110, and acquires user location information indicating locations of the detected users. The head tracking system 120 may identify the location of the user by tracing locations of eyes of different users. The user location information may include user location information indicating the location of the user 101 and user location information indicating the location of the user 102. Also, the user location information may include eye location information indicating locations of eyes of the users.

According to one embodiment, the head tracking system 120 may detect the eyes of the user 101 from the image output from the camera 110 and generate eye location information indicating the locations of the eyes by identifying the locations of the eyes. The head tracking system 120 may detect the eyes of the user 101 by using a face image of the user 101, which is previously taken.

The image processing system 130 calculates the distance between the users by using the user location information acquired by the head tracking system 120. For example, the image processing system 130 calculates the distance d between the users 101 and 102 by using the user location information acquired by the head tracking system 120.

The image processing system 130 may control the location of the sweet spot on the basis of the distance d and the length of the dead zone.

According to one embodiment of the present invention, the image processing system 130 may determine arrangement of a plurality of view images on the basis of the distance d and the length of the dead zone and arrange and synthesize the view images in accordance with the determined arrangement. And, the image processing system 130 controls the display panel 140 so that the synthesized view images are displayed.

According to one embodiment, the image processing system 130 may determine a three-dimensional image pixel period on the basis of the distance d and the length of the dead zone and arrange and synthesize the view images in accordance with the determined three-dimensional image pixel period. And, the image processing system 130 controls the display panel 140 so that the synthesized view images are displayed.

According to one embodiment, the image processing system 130 may determine an interval between the display panel 140 and the filter on the basis of the distance d and the length of the dead zone and control the interval between the display panel and the filter in accordance with the determined interval. In this case, the filter may be a three-dimensional image filter that controls an optical path of the view images displayed by the display panel 140.

According to one embodiment of the present invention, the filter may include light-transmitting zones and non-light-transmitting zones, which are arranged at constant intervals. The light emitted from the display panel 140 reaches the right eye or the left eye of the user through the light-transmitting zone. If the filter is a liquid crystal parallax barrier, the non-light-transmitting zone may be configured as a barrier, and a pair of light-transmitting zone and non-light-transmitting zone may be referred to as a pitch. The light-transmitting zone and non-light-transmitting zone of the filter may be shifted under the control of the image processing system 130. At this time, the filter may be fixed to the display panel 140. Also, the filter may have a plurality of switch modes indicating the location of the non-light-transmitting zone. In other words, the filter may have a switch mode indicating the location of the non-light-transmitting zone per location of the non-light-transmitting zone.

According to one embodiment, if the filter is a liquid crystal lenticular filter, the light-emitting zone may be identified from the non-light-transmitting zone by a lens, and one lens may be referred to as a pitch. The lens of the filter may be shifted under the control of the image processing system 130. At this time, the filter may be fixed to the image processing system 130. Also, the filter has a plurality of switch modes indicating the location of the lens. In other words, the filter may have a switch mode indicating the location of the lens per location.

According to one embodiment, the image processing system 130 may determine the barrier of the filter or the location of the lens on the basis of the distance d and the length of the dead zone and control the barrier of the filter or the location of the lens in accordance with the determined location.

According to one embodiment, the image processing system 130 may determine a three-dimensional image pixel period and an interval between the display panel and the filter on the basis of the distance d and the length of the dead zone. And, the image processing system 130 arranges and synthesizes the view images in accordance with the determined three-dimensional image pixel period and controls the display panel 140 so that the synthesized view images are displayed. Also, the image processing system 130 may control the interval between the display panel and the filter in accordance with the determined interval.

The display panel 140 displays a multi-view image under the control of the image processing system 130. The display panel 140 may be a barrier type glassless 3D display of two views or more, or a lenticular type glassless 3D display. Also, the display panel 140 may be a glassless 3D display of which view format is a sub-pixel unit or a pixel unit.

Figure 2:
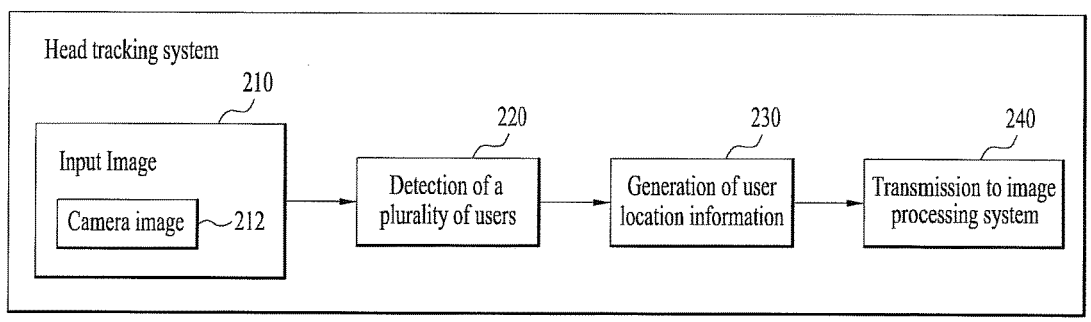
FIG. 2 is a flow chart illustrating a procedure of processing a head tracking system according to one embodiment of the present invention.

FIG. 2 is a flow chart illustrating a procedure of processing a head tracking system according to one embodiment of the present invention.

Referring to FIG. 2, the head tracking system 120 receives input data 210. In this case, the input data may include a camera image 212. Also, the input data 210 may further receive depth information on an object included in the camera image 212. The camera image 212 may be an image frame taken by the camera 110 for the watching zone, or may include images of a plurality of users.

The head tracking system 120 detects a plurality of users from the camera image 212 (220). In this case, the head tracking system 120 may detect the user by using a face image of the user, wherein the face image is previously stored, and may detect eyes of the user.

The head tracking system 120 generates user location information (230). The user location information may include user location information indicating the location of each of the plurality of users. The user location information may location information indicating the location of each of a left eye and a right eye of the user.

The head tracking system 120 transmits the user location information to the image processing system 130 (240).

Figure 3:
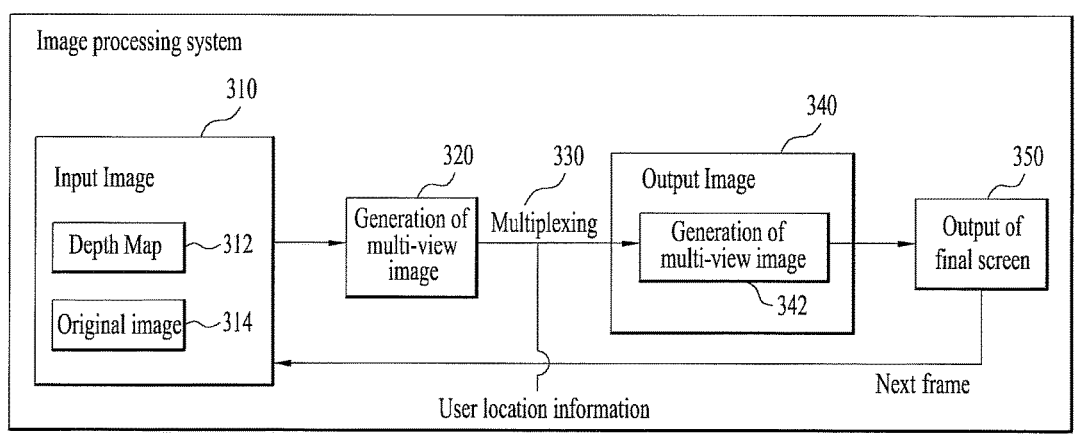
FIG. 3 is a flow chart illustrating a procedure of processing an image processing system according to one embodiment of the present invention.

FIG. 3 is a flow chart illustrating a procedure of processing an image processing system according to one embodiment of the present invention.

Referring to FIG. 3, the image processing system 130 receives an input image 310. The input image 310 may include a depth map 312 and an original image 314.

The image processing system 130 generates a multi-view image by using the input image 310 (320). According to one embodiment, the image processing system 130 may generate the multi-view image including 55 view images, or may generate the multi-view image including 44 view images.

The image processing system 130 receives the user location information from the head tracking system 120. According to one embodiment, if the received user location information includes user location information on one user, the image processing system 130 performs multiplexing (330) of the view images on the basis of the user location information. According to another embodiment, if the received user location information includes user location information on a plurality of users, the image processing system 130 calculates the distance between the respective users on the basis of the received user location information. The image processing system 130 performs multiplexing (330) of the view images on the basis of the calculated distance between the respective users and the length of the dead zone.

The image processing system 130 generates an output image (340) through the multiplexing (330). The output image (340) includes an image 342 synthesized through the multiplexing (330). The synthesized image 342 may be the image obtained by synthesizing the view images included in the multi-view image.

The image processing system 130 controls a final screen output (350) so that the output image (340) is displayed. The display panel 140 displays the output image.

Figure 4:
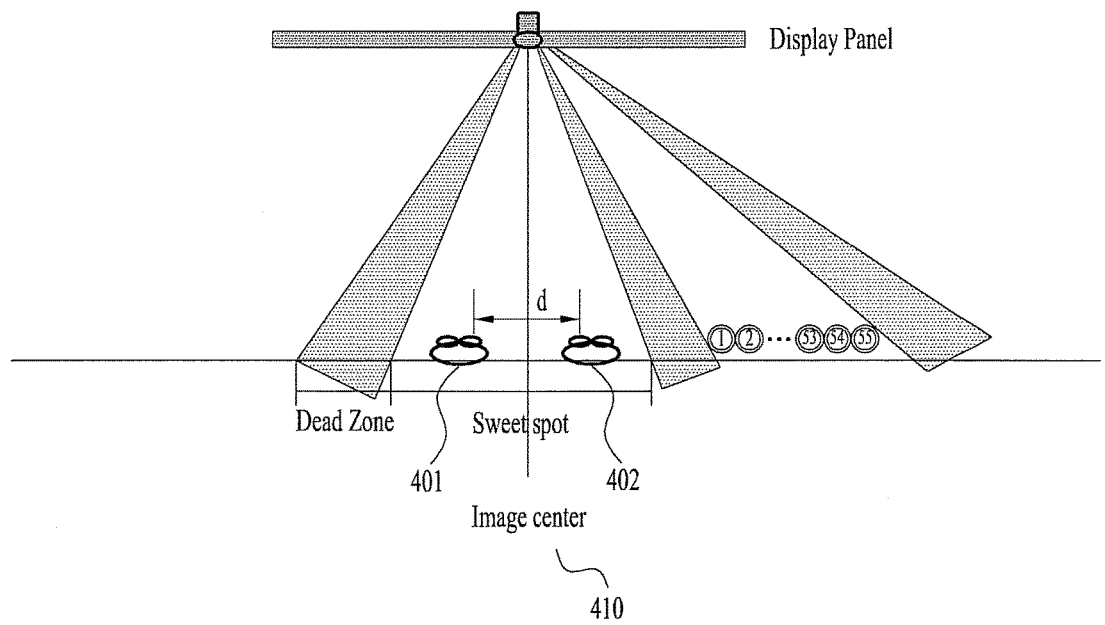
FIG. 4 is a diagram illustrating an example of a location of a center of a multi-view image which is displayed.
Figure 5:
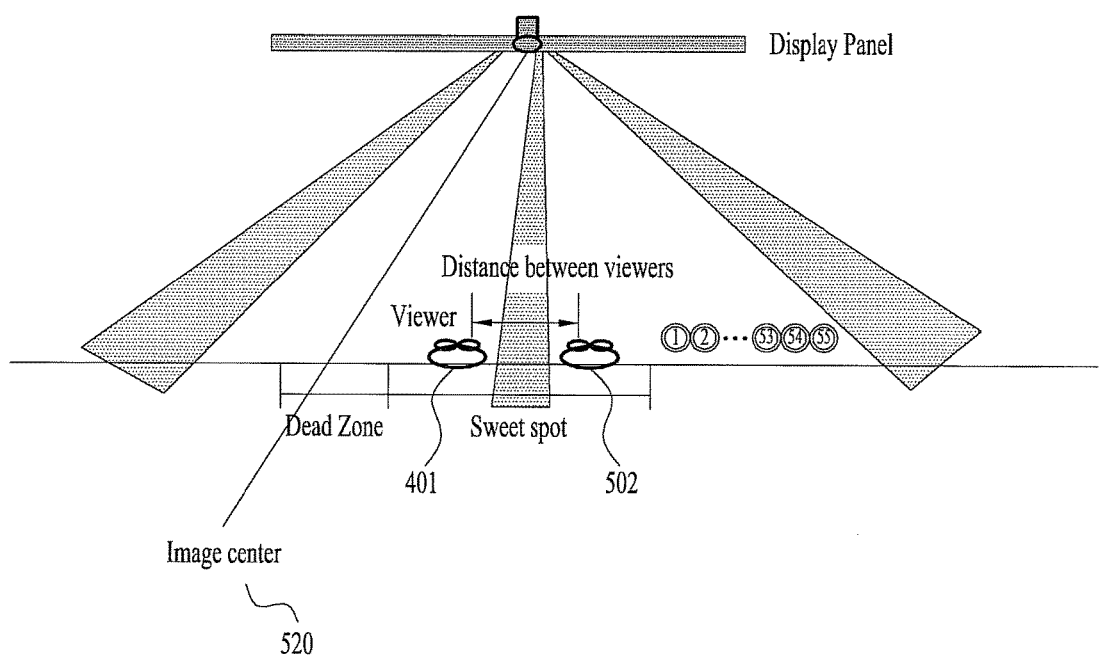
FIG. 5 is a diagram illustrating another example of a location of a center of a multi-view image which is displayed.

FIG. 4 is a diagram illustrating an example of a location of a center of a multi-view image which is displayed, and FIG. 5 is a diagram illustrating another example of a location of a center of a multi-view image which is displayed.

Referring to FIG. 4 and FIG. 5, when the distance between a user 401 and a user 402 is d, the image processing system 130 may display an image center 410 on the center between the user 401 and the user 402 and arrange view images on the basis of the image center 410.

As the user 402 moves to a point 502, if the distance between the user 401 and the user 402 is greater than the distance d, the image processing system 130 may display an image center on a location 520 and arrange view images on the basis of the image center 520.

Figure 6:
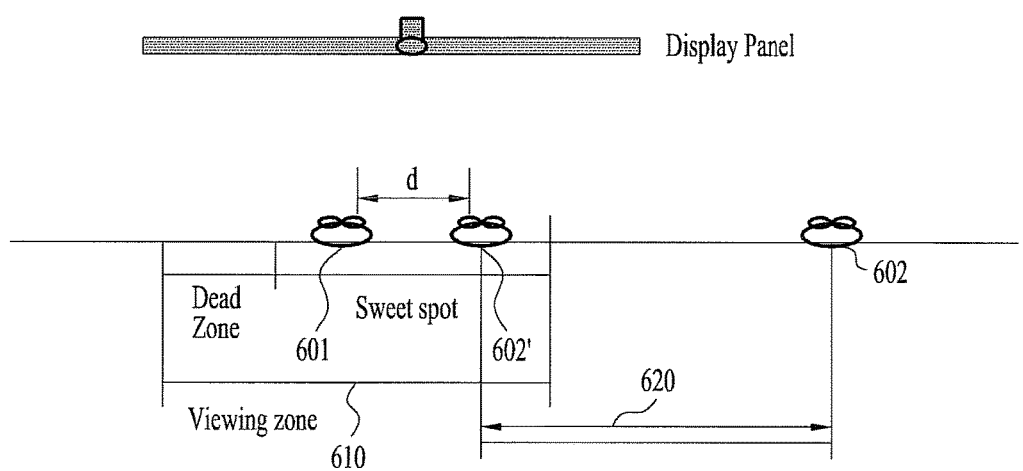
FIG. 6 is a diagram illustrating a method of calculating a distance between a plurality of users who are detected.

FIG. 6 is a diagram illustrating a method of calculating a distance between a plurality of users who are detected.

Referring to FIG. 6, if the first user is located at a point 601 and the second user is located at a point 602, the image processing system 130 moves the location of the first user or the second user as much as the distance corresponding to the viewing zone so that the distance between the first user and the second user is smaller than the viewing zone. For example, in order that the distance between the first user and the second user is smaller than the viewing zone, the image processing system 130 moves the second user located at the point 602 as much as the distance 620 corresponding to the viewing zone, whereby the second user may be located at a point 602' of the same viewing zone as that of the point 601. The distance 620 may be the distance of one viewing zone or a plurality of viewing zones.

Figure 7:
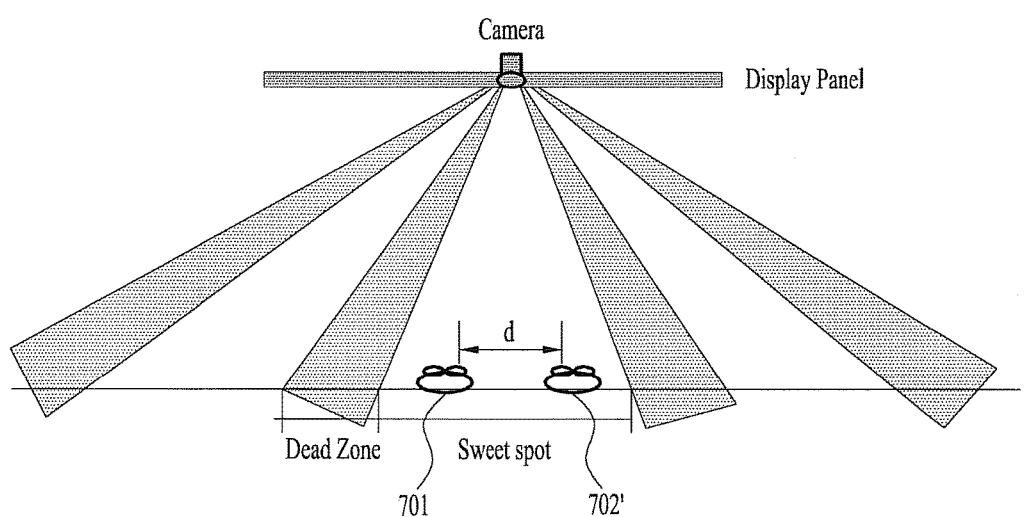
FIG. 7 is a diagram illustrating an example that an image system according to the present invention controls a location of a sweet spot in accordance with a distance between users.

FIG. 7 is a diagram illustrating an example that an image system according to the present invention controls a location of a sweet spot in accordance with a distance between users.

Referring to FIG. 7, if the distance between the first user 701 and the second user 702' is smaller than the size of the dead zone, the image processing system 130 may control at least one of arrangement of the view images, the three-dimensional image pixel period, and the interval between the display panel and the filter, so that the first user 701 and the second user 702' may be located at the same sweet spot.

According to one embodiment, if the distance between the first user 701 and the second user 702' is smaller than the size of the dead zone, the image processing system 130 may control at least one of arrangement of the view images, the three-dimensional image pixel period, and the interval between the display panel and the filter, so that the center of the sweet spot may be located between the first user 701 and the second user 702'. The location 702' of the second user may be the location moved in accordance with the method described with reference to FIG. 6.

According to one embodiment, if the distance between the first user 701 and the second user 702' is smaller than the size of the dead zone, the image processing system 130 may control at least one of arrangement of the view images, the three-dimensional image pixel period, and the interval between the display panel and the filter, so that the center of the sweet spot may be located at the center between the first user 701 and the second user 702'. The location 702' of the second user may be the location moved in accordance with the method described with reference to FIG. 6.

According to one embodiment, if the distance between the first user 701 and the second user 702' is smaller than the size of the dead zone, the image processing system 130 may control at least one of arrangement of the view images, the three-dimensional image pixel period, and the interval between the display panel and the filter, so that the image center may be located at the center between the first user 701 and the second user 702'.

Figure 8:
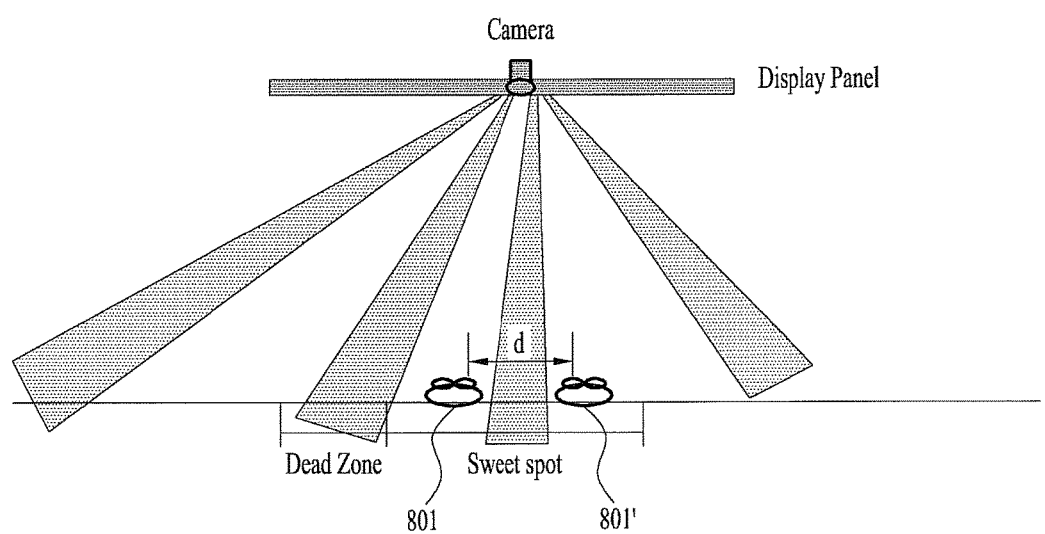
FIG. 8 is a diagram illustrating another example that an image system according to the present invention controls a location of a sweet spot in accordance with a distance between users.

FIG. 8 is a diagram illustrating another example that an image system according to the present invention controls a location of a sweet spot in accordance with a distance between users.

According to one embodiment, if the distance between the first user 801 and the second user 802' is greater than the size of the dead zone, the image processing system 130 may control at least one of arrangement of the view images, the three-dimensional image pixel period, and the interval between the display panel and the filter, so that the dead zone may be located between the first user 801 and the second user 802'. The location 802' of the second user may be the location moved in accordance with the method described with reference to FIG. 6.

According to one embodiment, the image processing system 130 may control at least one of arrangement of the view images, the three-dimensional image pixel period, and the interval between the display panel and the filter, so that the center of the dead zone may be located at the center between the first user 801 and the second user 802'. The location 802' of the second user may be the location moved in accordance with the method described with reference to FIG. 6.

FIG. 9 is a diagram illustrating an example of a view table according to the present invention.

Referring to FIG. 9, the view table 900 represents arrangement of view images at a starting point. In the view table 900, sub-pixels of blue (B), red (R) and green (G) are alternately arranged in a column direction and sub-pixels of the same color are arranged in a row direction.

In the view table, a number marked in each sub-pixel means a number of a view image which will be displayed by the corresponding sub-pixel. For example, '1' means the first view image, '6' means the sixth view image, and '11' means the eleventh view image.

According to one embodiment, the view image View which will be displayed in a sub-pixel (m, n) of the view table 900 may be determined on the basis of the following Equation 1. In this case, m is an index of a column, and n is an index of a row.

View=(Initial View)+{(Horizontal View Step)*m+
(Vertical View Step)*n}%NView     [Equation 1]

In this case, Initial View is a number of a view image displayed in a sub-pixel (0,0), Horizontal View Step is a number increased in a column direction, Vertical View Step is a number increased in a row direction, and NView is the number of view images.

The view table 900 represents arrangement of view images at a starting point for a multi-view image of which Horizontal View Step is 5, Vertical View Step is 6, and the number of view images is 40. The starting point means that the view image marked in the sub-pixel is the first view image.

FIG. 10 is a diagram illustrating another example of a view table according to the present invention.

Referring to FIG. 10, the view table 1000 is the view table shifted as much as four views from the starting point for a multi-view image of which Horizontal View Step is 5, Vertical View Step is 6, and the number of view images is 40. The view image marked in the sub-pixel (0, 0) of the view table 1000.

In a state that the view table 900 shown in FIG. 9 is displayed in the display panel 110, if the image processing system 130 arranges and synthesizes the view images in accordance with the view table 1000 and outputs the synthesized view images to the display panel 110, the viewing zone is shifted as much as the size occupied by four view images within the viewing zone, and as a result, the sweet spot is shifted. In other words, the image processing system 130 may control the location of the sweet spot by controlling the arrangement of the view images.

Figure 11:
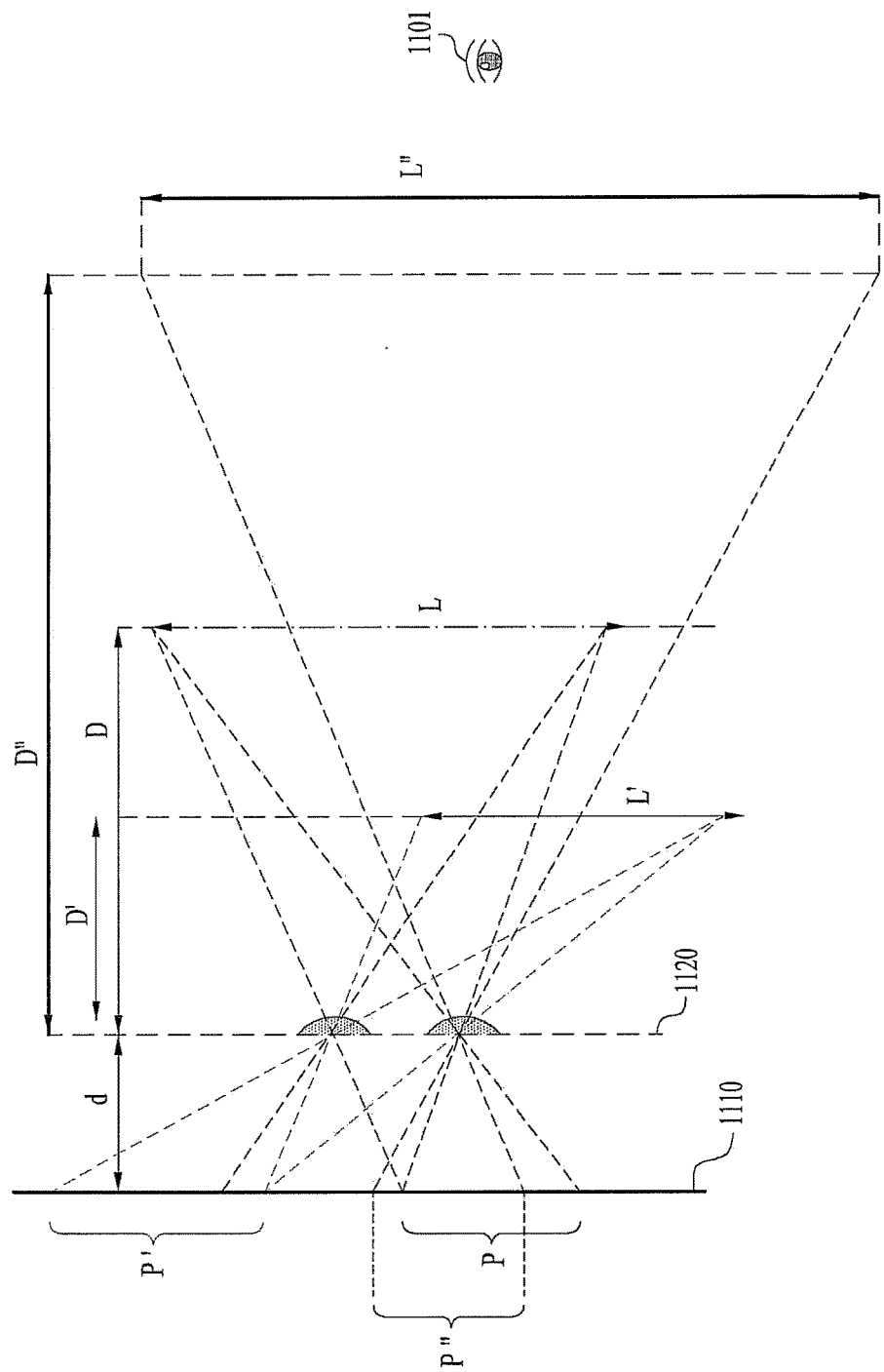
FIG. 11 is a diagram illustrating a method for controlling a view distance according to the present invention.

FIG. 11 is a diagram illustrating a method for controlling a view distance according to the present invention.

Referring to FIG. 11, the image processing system 130 may control the location and size of the viewing zone L by controlling the three-dimensional image pixel period P. Also, the image processing system 130 may control the location and size of the sweet spot by controlling the location and size of the viewing zone L. In other words, the image processing system 130 may control the sweet spot to correspond to the location of the user 1101 by controlling the three-dimensional pixel image period P.

The image processing system 130 may control a view distance D by controlling a scale factor (SF). The location and size of the viewing zone L are controlled in accordance with the view distance D.

The scale factor (SF) is defined as expressed by the following Equation 2.

$$SF=p'/p=(D'+d)/D'*(D+d)/D$$     [Equation 2]

In this case, d is the interval between the display panel 1110 and the filter 1120, D is the viewing zone, p' is the controlled three-dimensional image pixel period, and D' is the controlled view distance.

If the image processing system 130 increases the three-dimensional image pixel period P to P', the view distance D is decreased to the view distance D', and the viewing zone L is controlled to the viewing zone L'.

If the image processing system 130 decreases the three-dimensional image pixel period P to P", the view distance D is increased to the view distance D", and the viewing zone L is controlled to the viewing zone L".

Figure 12:
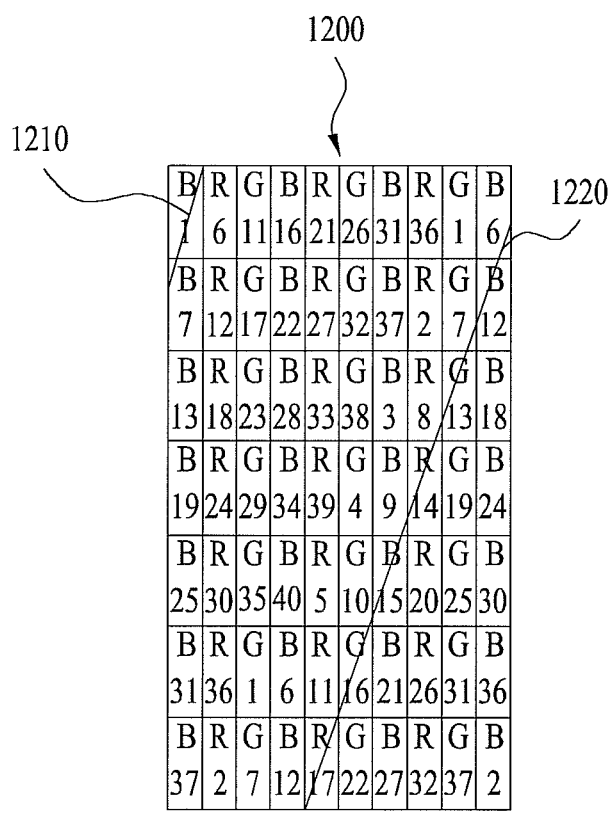
FIG. 12 is a diagram illustrating still another example of a view table according to the present invention.

FIG. 12 is a diagram illustrating still another example of a view table according to the present invention, especially illustrating a view table at an optimized view distance.

Referring to FIG. 12, the view table 1200 has the same arrangement as that of the view table 900 shown in FIG. 9. A line 1210 and a line 1220 mean edges defining a width of a non-light-transmitting zone of the filter or edges of the lens of the filter.

According to one embodiment, the view distance VD of the view image which will be displayed in the sub-pixel (m, n) of the view table 1200 may be determined on the basis of the following Equation 3. In this case, m is an index of a column, and n is an index of a row.

$$VD = Y \text{ direction Initial View} + X \text{ direction View} = (Dist\_y/DPV\_y + Dist\_X/DPV\_x)\%Nview \quad [\text{Equation 3}]$$

In this case, Initial View is a number of the view image marked in the sub-pixel (0, 0), and NView is a total number of view images.

Dist_x is defined as expressed by the following Equation 4.

$$Dist\_x = PH*m \quad [\text{Equation 4}]$$

In this case, PH is a horizontal length of the sub-pixel.

Dist_y is defined as expressed by the following Equation 5.

$$Dist\_y = Pv*n \quad [\text{Equation 5}]$$

In this case, Pv is a vertical length of the sub-pixel.

DPV_x is defined as expressed by the following Equation 6.

$$DPV\_x = PH \times 1/Hstep \times SF \quad [\text{Equation 6}]$$

In this case, Hstep is a number increased in a column direction, and SF is a scale factor.

DPV_y is defined as expressed by the following Equation 7.

$$DPV\_y = Pv \times 1/Vstep \times SF \quad [\text{Equation 7}]$$

In this case, Vstep is a number increased in a row direction.

The view table 110 is the view table of the starting point, of which Hstep is 5, Vstep is 6, a total number of view images is 40, and SF is 1.

FIG. 13 is a diagram illustrating further still another example of a view table according to the present invention, especially illustrating a view table when a view distance is shifted from an optimized view distance.

Referring to FIG. 13, the view table 1300 is the view table of the starting point, of which Hstep is 5, Vstep is 6, a total number of view images is 40, and SF is 1.001989. The view image View which will be displayed in the sub-pixel (m, n) of the view table 1300 may be obtained on the basis of the following Equation 8.

$$View = 0 + \{4.99*m + 5.98*n\}\%40 \quad [\text{Equation 8}]$$

The Equation 8 is induced from the Equation 7.

A line 1310 and a line 1320 mean edges defining a width of a non-light-transmitting zone of the filter or edges of the lens of the filter.

Figure 14:
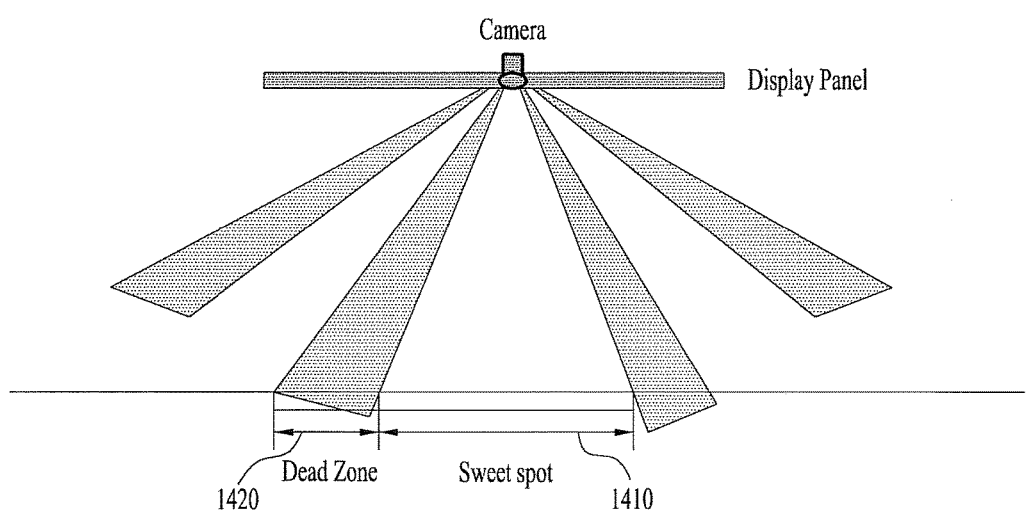
FIG. 14 is a diagram illustrating an example of arrangement of a sweet spot and a dead zone according to the present invention.
Figure 15:
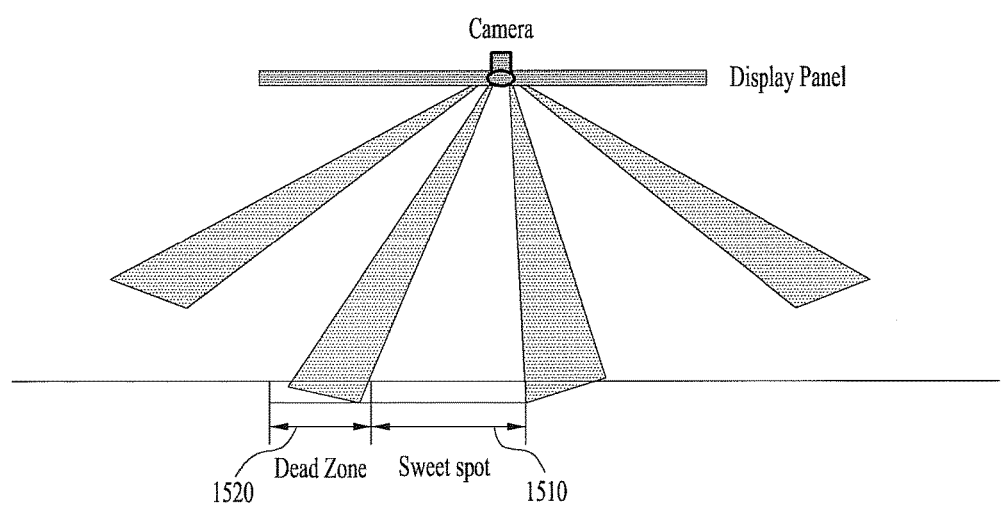
FIG. 15 is a diagram illustrating another example of arrangement of a sweet spot and a dead zone according to the present invention.

FIG. 14 is a diagram illustrating an example of arrangement of a sweet spot and a dead zone according to the present invention, and FIG. 15 is a diagram illustrating another example of arrangement of a sweet spot and a dead zone according to the present invention.

Referring to FIG. 14 and FIG. 15, a zone 1410 and a zone 1420 respectively mean a sweet spot and a dead zone at the optimized view distance. If the view distance is shifted, the sweet spot 1410 and the dead zone 1420 are shifted to a zone 1510 and a zone 1520, respectively. As the view distance is shifted, at least one of the length and location of the sweet spot and the dead zone is shifted.

Figure 16:
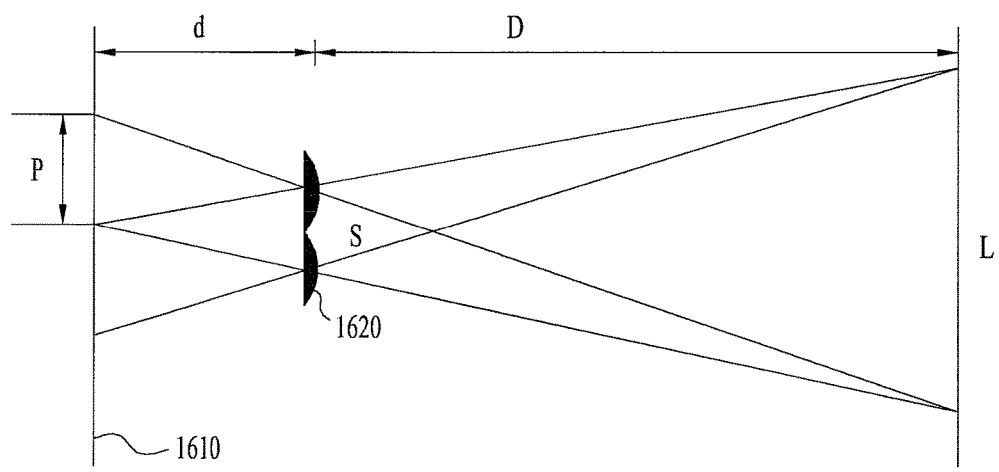
FIG. 16 is a diagram illustrating an example of a pixel period of a three-dimensional image and an interval between a display panel and a filter according to the present invention.
Figure 17:
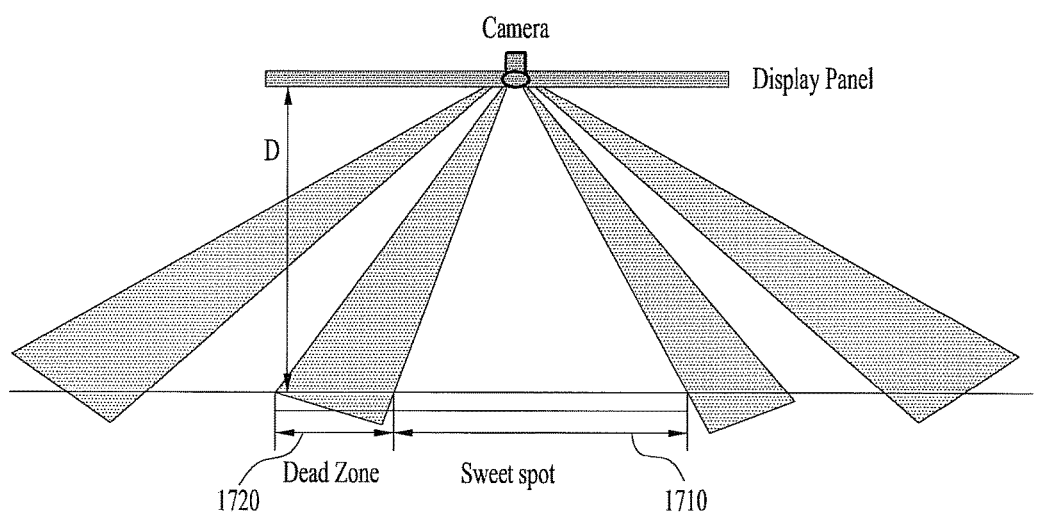
FIG. 17 is a diagram illustrating arrangement of a sweet spot and a dead zone according to the embodiment of FIG. 16.

FIG. 16 is a diagram illustrating an example of a pixel period of a three-dimensional image and an interval between a display panel and a filter according to the present invention, and FIG. 17 is a diagram illustrating arrangement of a sweet spot and a dead zone according to the embodiment of FIG. 16.

Referring to FIG. 16 and FIG. 17, the image processing system 130 may control the location and size of the viewing zone L by controlling the interval d between the display panel 1610 and the filter 1620. Also, the image processing system 130 may control the location and size of the sweet spot by controlling the location and size of the viewing zone L.

If the interval between the display panel 1610 and the filter 1620 is d and the three-dimensional image pixel period is P, the sweet spot and the dead zone become a zone 1710 and a zone 1720, respectively.

Figure 18:
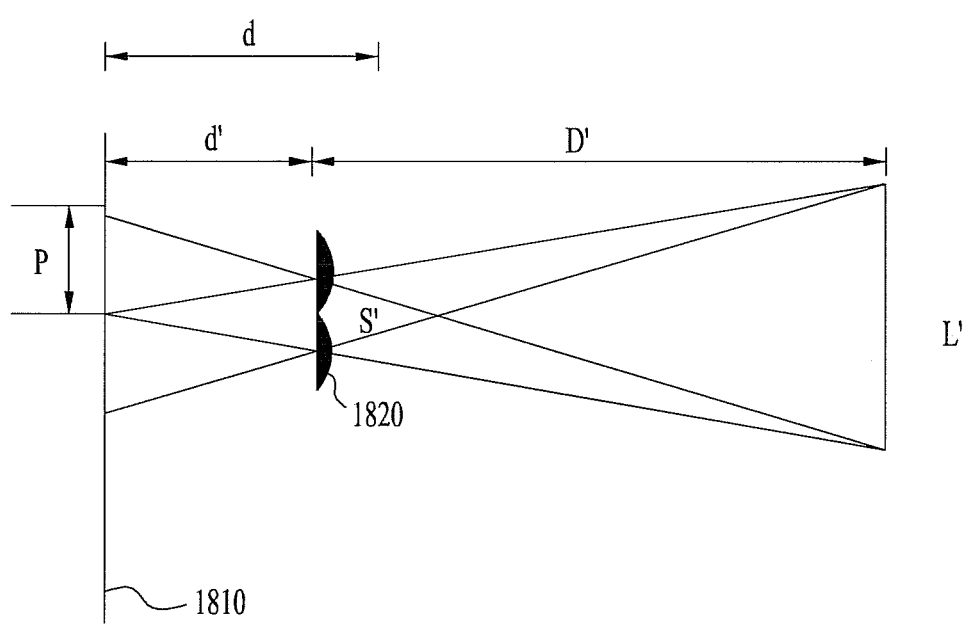
FIG. 18 is a diagram illustrating another example of a pixel period of a three-dimensional image and an interval between a display panel and a filter according to the present invention.
Figure 19:
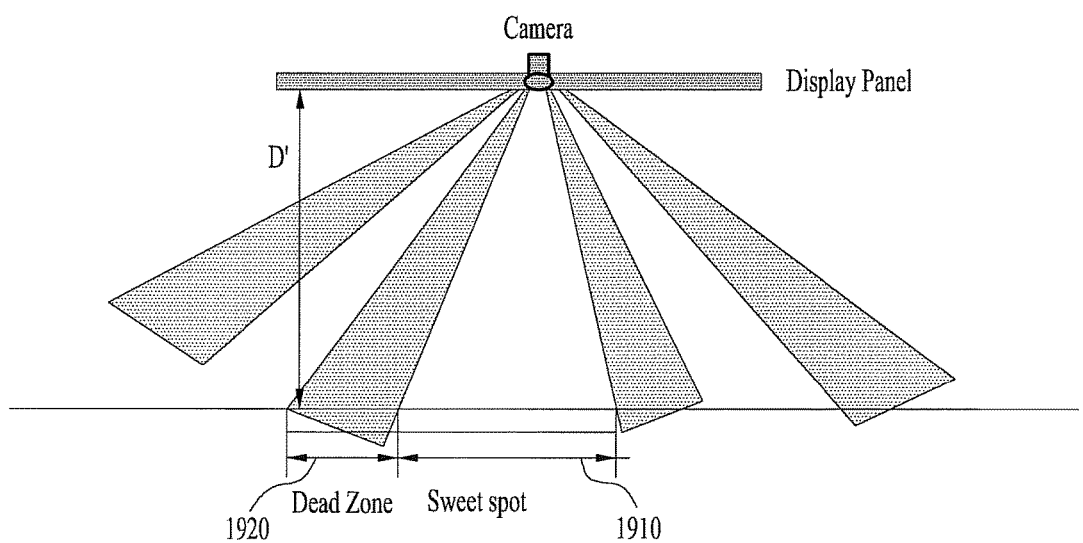
FIG. 19 is a diagram illustrating arrangement of a sweet spot and a dead zone according to the embodiment of FIG. 18.

FIG. 18 is a diagram illustrating another example of a pixel period of a three-dimensional image and an interval between a display panel and a filter according to the present invention, and FIG. 19 is a diagram illustrating arrangement of a sweet spot and a dead zone according to the embodiment of FIG. 18.

Referring to FIG. 18 and FIG. 19, the interval d' between the display panel 1810 and the filter 1820 is smaller than the distance d between the display panel 1610 and the filter 1620 of FIG. 16.

If the interval between the display panel 1810 and the filter 1820 is d' and the three-dimensional image pixel period is P, the sweet spot and the dead zone become a zone 1910 and a zone 1920, respectively.

If the image processing system 130 controls the interval between the display panel and the filter from d to d', the sweet spot is controlled from the zone 1710 of FIG. 17 to the zone 1910 of FIG. 19, and the dead zone is controlled from the zone 1720 of FIG. 17 to the zone 1920 of FIG. 19.

Figure 20:
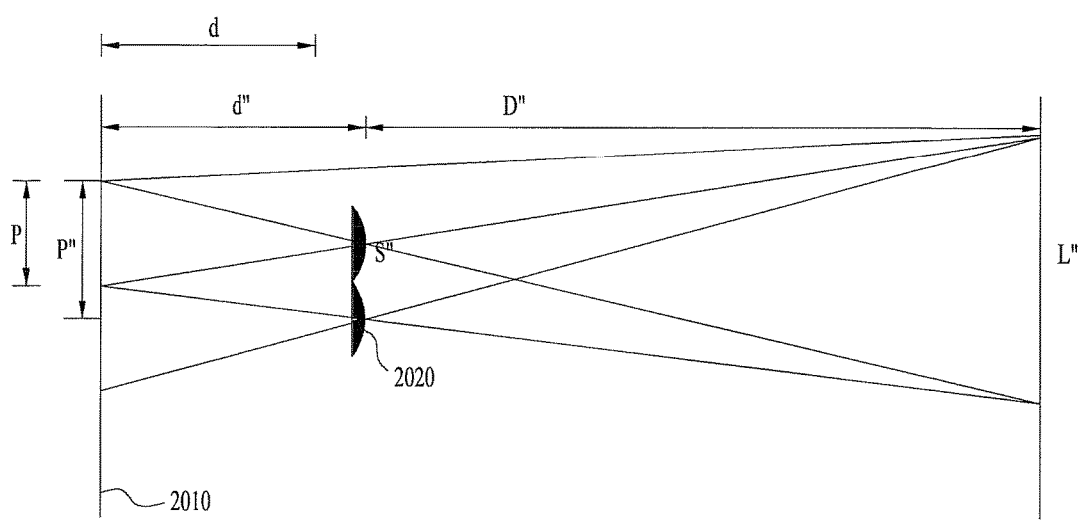
FIG. 20 is a diagram illustrating other example of a pixel period of a three-dimensional image and an interval between a display panel and a filter according to the present invention.
Figure 21:
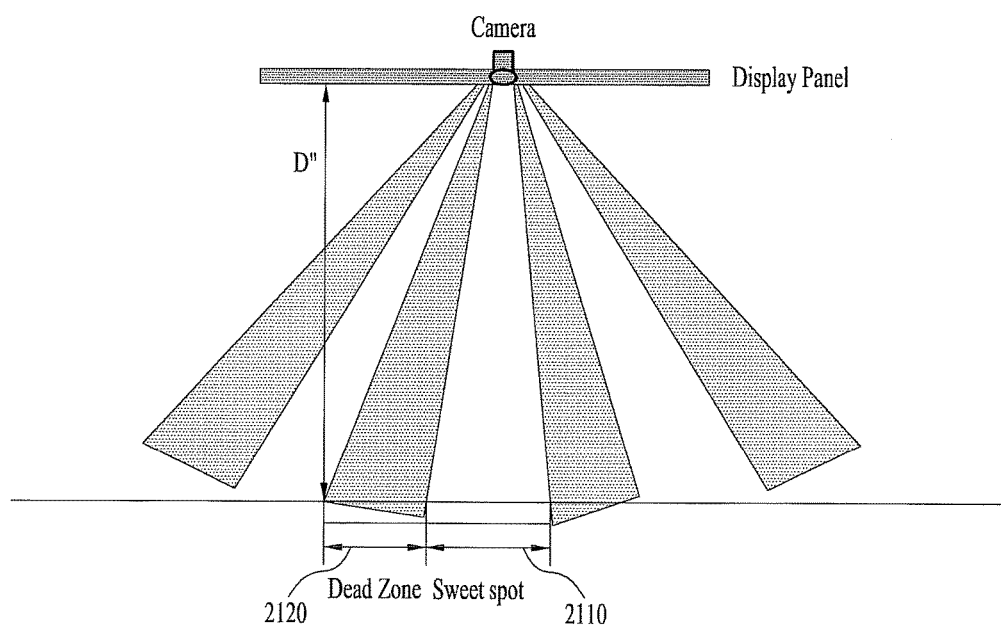
FIG. 21 is a diagram illustrating arrangement of a sweet spot and a dead zone according to the embodiment of FIG. 20.

FIG. 20 is a diagram illustrating other example of a pixel period of a three-dimensional image and an interval between a display panel and a filter according to the present invention, and FIG. 21 is a diagram illustrating arrangement of a sweet spot and a dead zone according to the embodiment of FIG. 20.

Referring to FIG. 20 and FIG. 21, the interval d' between the display panel 2010 and the filter 2020 is greater than the distance d between the display panel 1610 and the filter 1620 of FIG. 16.

If the interval between the display panel 2010 and the filter 2020 is d" and the three-dimensional image pixel period is P", the sweet spot and the dead zone become a zone 2110 and 2120, respectively.

If the image processing system 130 controls the interval between the display panel and the filter from d to d" and controls the three-dimensional image pixel period from P to P", the sweet spot is controlled from the zone 1710 of FIG.

17 to the zone 2110 of FIG. 21, and the dead zone is controlled from the zone 1720 of FIG. 17 to the zone 2120 of FIG. 21.

Figure 22:
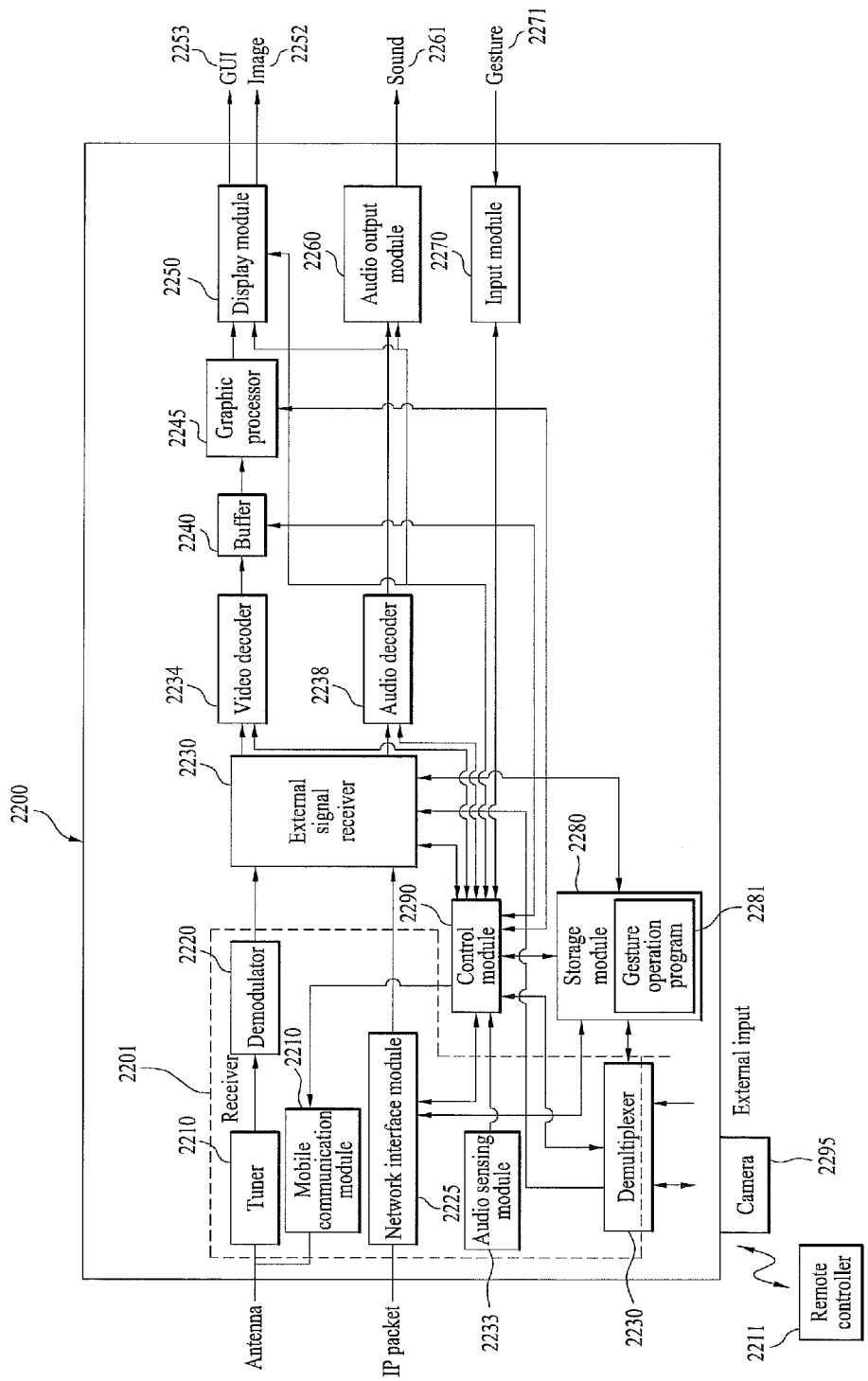
FIG. 22 is a block diagram illustrating a three-dimensional image processing apparatus according to the preferred embodiment of the present invention.

FIG. 22 is a block diagram illustrating a three-dimensional image processing apparatus according to the preferred embodiment of the present invention.

Referring to FIG. 22, an three-dimensional image processing apparatus 2200 according to the present invention may include at least one of a receiver 2201, a demultiplexer 2232, a video decoder 2234, an audio decoder 2238, a buffer 2240, a graphic processor 2245, a display module 2250, an audio output module 2260, an input module 2270, a storage module 2280, and a control module 2290. The three-dimensional image processing apparatus 2200 may include a camera 2295 depending on the embodiments.

The three-dimensional image processing apparatus 2200 corresponds to an intelligent display device that additionally provides a computer support function in addition to a broadcasting receiving function. Accordingly, in accordance with additional Internet function together with the broadcasting receiving function, the three-dimensional image processing apparatus 2200 may be provided with a more convenient interface such as a manual input unit, a touch screen, a touch pad, or a magic remote controller. Also, the three-dimensional image processing apparatus 2200 may perform functions such as e-mailing, web browsing, banking or games by accessing Internet or computer in accordance with the support of wire or wireless Internet function. For these various functions, a standardized general-purpose operating system (OS) may be used. For example, since various applications may freely be added or deleted on a general-purpose OS kernel, the three-dimensional image processing apparatus 2200 may perform user-friendly various functions. In more detail, the three-dimensional image processing apparatus 2200 may be a network TV, an HBB TV, a smart TV, an open hybrid TV (OHTV), or the like, and may be applied to a mobile terminal, a smart phone, a PC and electronic devices as the case may be.

The three-dimensional image processing apparatus 2200 performs the functions of the image system 100 of FIG. 1. The image system 100 may be implemented as the three-dimensional image processing apparatus 2200.

The receiver 2201 may receive broadcasting data, video data, audio data, information data and application data. The video data may be the video data for displaying a two-dimensional image and the video data for displaying a three-dimensional image. Also, the there-dimensional image may include at least one of a stereo image and a multi-view image. Moreover, the three-dimensional image may include the input image 310 shown in FIG. 3.

The three-dimensional image may be a three-dimensional moving picture (three-dimensional video) that includes a plurality of three-dimensional image frames. According to one embodiment, the three-dimensional image frame may include a two-dimensional image frame having a specific width and a depth image corresponding to the two-dimensional image. In this case, the two-dimensional image frame includes color image data. The color image data includes a pixel value. Hereinafter, the two-dimensional image frame will be referred to as a color image. The depth image may be expressed at a grey level. The two-dimensional image frame may have the same resolution as pixel resolution. Pixels included in the depth image may have depth values corresponding to pixels included in the two-dimensional image frame one by one. The depth value may be expressed at the grey level. For example, the grey level may have a value between 0 and 255.

The receiver 2201 may include a tuner 2210, a demodulator 2220, a mobile communication module 2215, a network interface module 2225, an audio sensing module 2233, and an external signal receiver 2235. The tuner 2210 may receive stream signals, which include data, through a broadcast network, and the demodulator 2220 demodulates the received stream signals. The mobile communication module 2215 may receive data through a mobile communication network such as 2G communication network, 3G communication network and 4G communication network. Also, the network interface module 2225 may transmit and receive data through the network, and the external signal receiver 2235 may receive applications and contents from the external device and receive an image frame from the camera 2295. In this case, the image frame may be the image frame taken by the user.

The demultiplexer 2230 demultiplexes the stream signals output from the demodulator 2220 to video signal and audio signal. Also, the demultiplexer 2230 may receive video data, audio data, broadcast data, information data and application data from the mobile communication module 2215, the network interface module 2225, and the external signal receiver 2235.

The video decoder 2234 decodes the video signal demultiplexed by the demultiplexer 2230 and stores the decoded video signal in the buffer 2240.

The graphic processor 2245 controls the display module 2250 to display the image data stored in the buffer 2240. The graphic processor 2245 may arrange and synthesize the view images included in the image data and output the synthesized images to the display module 2250. The graphic processor 2245 may arrange the view images under the control of the control module 2290. In other words, the graphic processor 2245 may arrange the view images in accordance with the control signal for controlling arrangement of the view images generated by the control module 2290.

The audio decoder 2238 decodes the audio signal demultiplexed by the demultiplexer 2230 and output the decoded audio signal to the audio output module 2260.

The display module 2250 displays an image 2252. The image 2252 may be the image obtained by synthesizing the view images included in the multi-view image. Also, the image 2252 may include the output image 340 shown in FIG. 3. The display module 2250 may include the display panel 140 shown in FIG. 1, and may include the filter. The filter may be the three-dimensional image filter that controls an optical path of the view images displayed by the display panel 140.

Also, the display module 2250 may be operated by being connected with the control module 2290. The display module 2250 may display a graphic user interface (GUI) 2253 that provides an interface which is easy to be used between the user of the apparatus for processing a three-dimensional image and an operating system or application which is being implemented on the operating system.

The audio output module 2260 may receive audio data from the audio decoder 2238 and the control module 2290 and output a sound 2261 reproduced from the received audio data.

The input module 2270 may be a touch screen arranged on the display module 2250 or arranged at the front of the display module 2250, or may be a communication module that receives a signal from the remote controller 2211. The input module 2270 may receive a remote controller transmitting signal from the remote controller 2211.

According to one embodiment, the receiver 2201 may be the communication module that receives a signal from the remote controller 2211. In other words, the external signal receiver 2235 may receive the remote controller transmitting signal from the remote controller 2211.

The storage module 2280 generally provides a place for storing a program code and data used by the three-dimensional image processing apparatus 2200 for processing a three-dimensional image. In this case, the program code may be the program code of the application received by the receiver 2201 and the program code of the application stored when the apparatus 220 for processing a three-dimensional image is manufactured. Also, the application may be drafted by a programming language such as HTML, XML, HTML5, CSS, CSS3, Java Script, Java, C-language, C++, Visual C++, and C#.

The storage module 2280 may store a face image of the user, which is taken by the camera 2295. The control module 2290 may detect the user from the image taken by the camera 2295 by using the face image of the user, which is stored in the storage module 2280.

A read only memory (ROM), a random access memory (RAM), and a hard disk drive may be used as the storage module 2280. The program code and data may exist in a detachable storage medium, and, if necessary, may be loaded or installed on the three-dimensional image processing apparatus 2200 for processing a three-dimensional image. The detachable storage medium may include a CD-ROM, a PC-CARD, a memory card, a floppy disk, a magnetic tape, and a network component.

The control module 2290 implements a command language and performs related to the three-dimensional image processing apparatus 2200. For example, the control module 2290 may control input and output between components of the three-dimensional image processing apparatus 2200 and data reception and processing by using the command language detected from the storage module 2280.

The control module 2290 implements a program code together with an operating system, and generates and uses data. The operating system is generally known and will not be described in more detail. For example, the operating system may be a window based OS, Unix, Linux, Palm OS, DOS, android and Macintosh. The operating system, other computer code and data may exist in the storage module 2280 operated by being connected with the control module 2290.

The control module 2290 may be implemented on a single chip, a plurality of chips or a plurality of electrical components. For example, various architectures such as a dedicated or embedded processor, a single purpose processor, a controller, and ASIC may be used for the control module 2290.

The control module 2290 may recognize user action and control the three-dimensional image processing apparatus 2200 for processing a three-dimensional image on the basis of the recognized user action. In this case, the user action may include physical selection of a button of the apparatus for processing a three-dimensional image or the remote controller, action of a predetermined gesture on a touch screen display area, selection of a soft button, action of a predetermined gesture recognized from the image taken by the camera 2295, and action of a predetermined utterance recognized by voice recognition. The gesture may include a touch gesture and a spatial gesture.

The input module 2270 receives a gesture 2271, and the control module 2290 implements command languages for performing operations related to the gesture 2271. Moreover, the storage module 2280 may include a gesture operation program 2281 that may be a part of a separate application or operating system. The gesture operation program 2281 generally recognizes generation of the gesture 2271 and includes a series of commands notifying one or more software agents of the gesture 2271 or what action(s) should be taken in response to the gesture 2271.

The control module 2290 may perform the function of the head tracking system 120 of FIG. 1. The head tracking system 120 may be manufactured as software and driven on the control module 2290. The camera 110 shown in FIG. 1 may be the camera 2295.

The control module 2290 detects a plurality of users from the image output from the camera 2295 and acquires user location information indicating locations of the plurality of detected users. The control module 2290 may identify the location of the user by tracing the location of eyes of many people. The user location information may include user location information indicating the location of the first user and user location information indicating the location of the second user. Also, the user location information may include eye location information indicating the location of eyes of the user.

According to one embodiment, the control module 2290 may detect eyes of the user from the image output from the camera 2295 and generate eye location information indicating the location of eyes by identifying the location of eyes. The control module 2290 may detect eyes of the user by using the face image of the user, which is previously taken and stored in the storage module 2280.

Also, the control module 2290 may perform the function of the image processing system 130 of FIG. 1. The image processing system 130 may be manufactured as software and driven on the control module 2290.

The control module 2290 calculates the distance between the users by using the acquired user location information. For example, the control module 2290 calculates the distance d between the plurality of users by using the acquired user location information. The control module 2290 may calculate the distance between the users in accordance with the method described with reference to FIG. 4.

The control module 2290 may control the location of the sweet spot on the basis of the calculated distance d and the length of the dead zone.

According to one embodiment, the control module 2290 may determine arrangement of a plurality of view images on the basis of the distance d and the length of the dead zone and arrange and synthesize the view images in accordance with the determined arrangement. And, the control module 2290 controls the display module 2250 so that the synthesized view images are displayed.

According to one embodiment, the control module 2290 may generate a control signal for controlling arrangement of a plurality of view images on the basis of the distance d and the length of the dead zone and output the generated control signal to the graphic processor 2245.

According to one embodiment, the control module 2290 may determine a three-dimensional image pixel period on the basis of the distance d and the length of the dead zone and arrange and synthesize the view images in accordance with the determined three-dimensional image pixel period. And, the control module 2290 controls the display module 2250 so that the synthesized view images are displayed.

According to one embodiment, the control module 2290 may determine a three-dimensional image pixel period on the basis of the distance d and the length of the dead zone, generate a control signal for controlling arrangement of the plurality of view images in accordance with the determined three-dimensional image pixel period, and output the generated control signal to the graphic processor 2245.

According to one embodiment, the control module 2290 may determine an interval between the filter and the display panel of the display module 2250 on the basis of the distance d and the length of the dead zone and control the interval between the display panel and the filter in accordance with the determined interval. In this case, the filter may be the three-dimensional image filter that controls an optical path of view images displayed by the display panel.

According to one embodiment, the control module 2290 may determine arrangement of lens or barrier of the filter on the basis of the distance d and the length of the dead zone and control a location of the lens or barrier of the filter in accordance with the determined arrangement.

According to one embodiment, the control module 2290 may determine the three-dimensional image pixel period and the interval between the display panel and the filter on the basis of the distance d and the length of the dead zone. And, the control module 2290 arranges and synthesizes the view images in accordance with the determined three-dimensional image pixel period and controls the display module 2250 so that the synthesized view images are displayed. Also, the control module 2290 may control the interval between the display panel and the filter in accordance with the determined interval.

According to one embodiment, the control module 2290 may determine the three-dimensional image pixel period and the interval between the display panel and the filter on the basis of the distance d and the length of the dead zone. The control module 2290 may generate a control signal for controlling arrangement of the plurality of view images in accordance with the determined three-dimensional image pixel period and output the generated control signal to the graphic processor 2245.

Figure 23:
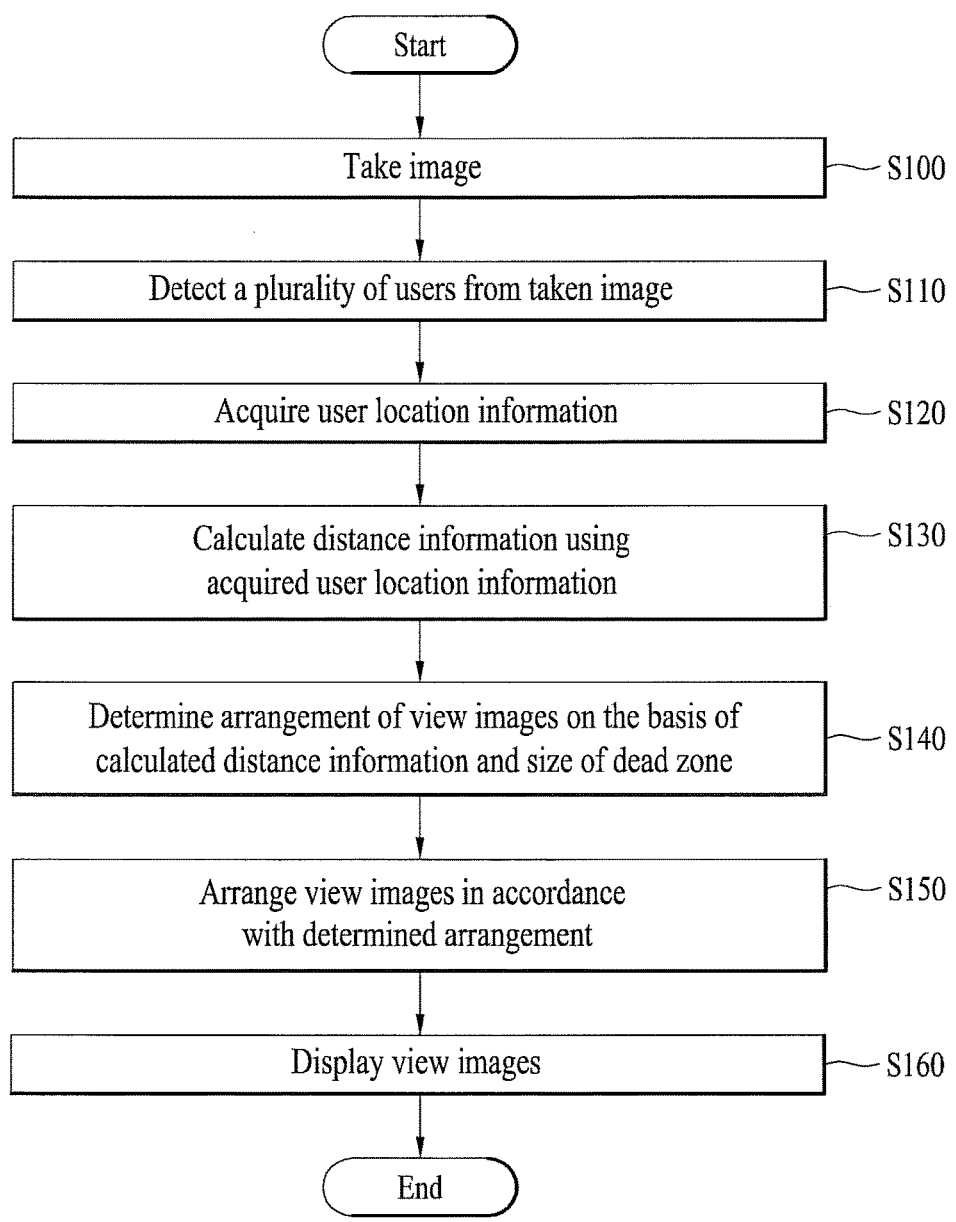
FIG. 23 is a flow chart illustrating a preferred example of a method for controlling a location of a sweet spot for displaying a multi-view image according to the present invention.

FIG. 23 is a flow chart illustrating a preferred example of a method for controlling a location of a sweet spot for displaying a multi-view image according to the present invention.

Referring to FIG. 23, the camera 2295 takes an image (S100).

The control module 2290 detects the plurality of users from the image taken by the camera 2295 (S110). Also, the control module 2290 may detect eyes of the user from the image output from the camera 2295. The control module 2290 may detect eyes of the user by using the face image of the user, which is previously taken and stored in the storage module 2280.

The control module 2290 acquires user location information indicating locations of the plurality of detected users (S120). The user location information may include at least one of eye location information indicating the location of eyes of the user and information indicating a location of a center point of a left eye and a right eye of the user.

The control module 2290 calculates the distance between the plurality of detected users by using the acquired user location information (S130). The control module 2290 may calculate the distance between the users in accordance with the method described with reference to FIG. 4.

The control module 2290 determines arrangement of a plurality of view images on the basis of the calculated distance and the length of the dead zone of the multi-view image (S140). According to one embodiment, the control module 2290 may determine the three-dimensional image pixel period on the basis of the distance d and the length of the dead zone and determine arrangement of the view images in accordance with the determined three-dimensional image pixel period. The control module 2290 may determine arrangement of the view images so that the sweet spot zone may be controlled in accordance with the method described with reference to FIG. 5 and FIG. 6.

The graphic processor 2245 arranges the view images in accordance with the arrangement determined by the control module 2290 and synthesizes the arranged view images (S150).

The display module 2250 displays the synthesized view images (S160).

Figure 24:
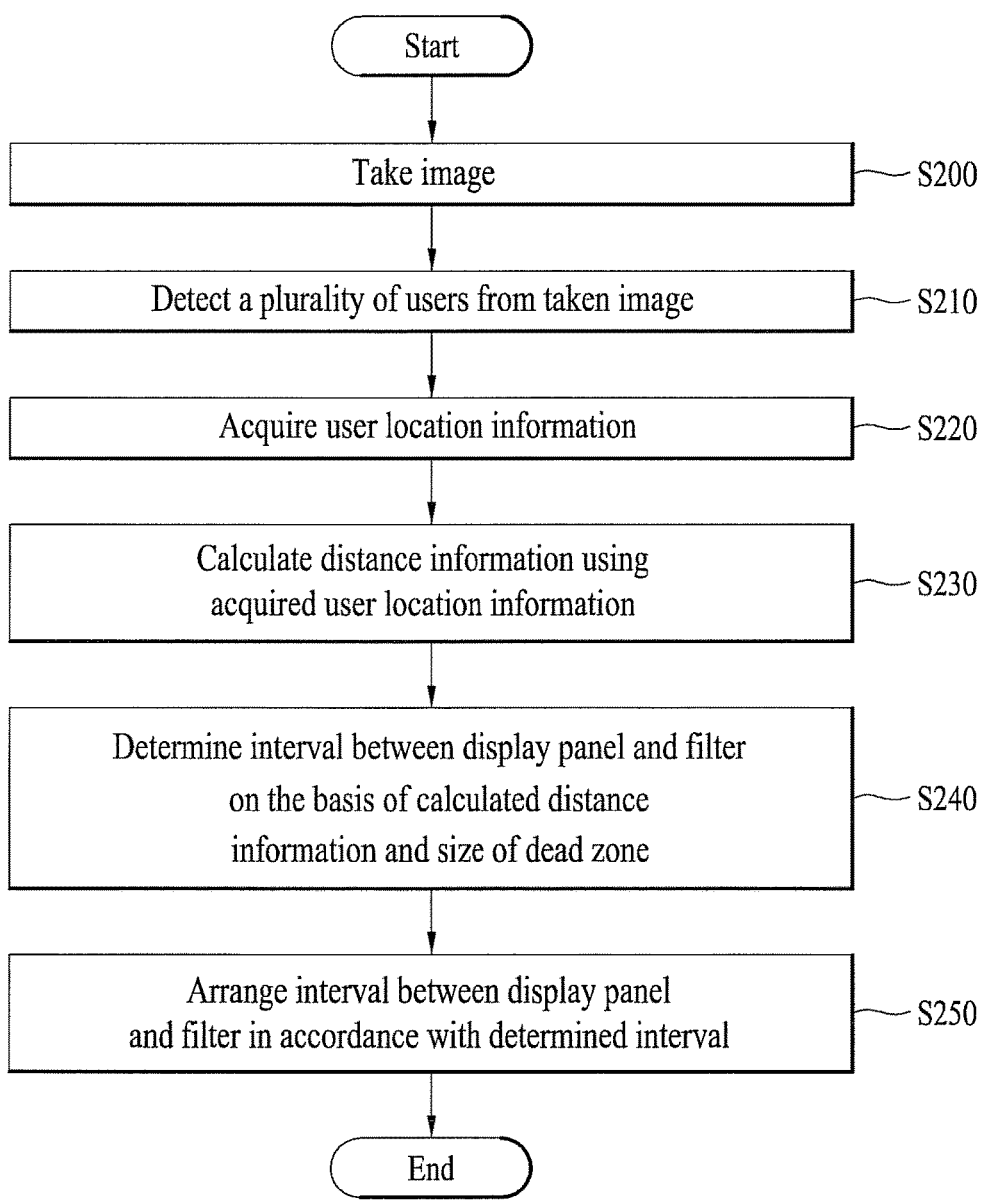
FIG. 24 is a flow chart illustrating another preferred example of a method for controlling a location of a sweet spot for displaying a multi-view image according to the present invention.

FIG. 24 is a flow chart illustrating another preferred example of a method for controlling a location of a sweet spot for displaying a multi-view image according to the present invention.

Referring to FIG. 24, the camera 2295 takes an image (S200).

The control module 2290 detects the plurality of users from the image taken by the camera 2295 (S210). Also, the control module 2290 may detect eyes of the user from the image output from the camera 2295. The control module 2290 may detect eyes of the user by using the face image of the user, which is previously taken and stored in the storage module 2280.

The control module 2290 acquires user location information indicating locations of the plurality of detected users (S220). The user location information may include at least one of eye location information indicating the location of eyes of the user and information indicating a location of a center point of a left eye and a right eye of the user.

The control module 2290 calculates the distance between the plurality of detected users by using the acquired user location information (S230). The control module 2290 may calculate the distance between the users in accordance with the method described with reference to FIG. 4.

The control module 2290 determines the interval between the display panel and the filter on the basis of the distance d and the length of the dead zone (S240). The control module 2290 may determine the interval between the display panel and the filter so that the sweet spot zone may be controlled in accordance with the method described with reference to FIG. 5 and FIG. 6.

The control module 2290 controls the graphic processor 2245 so that the interval between the display panel and the filter is controlled in accordance with the determined interval (S250). In this case, the graphic processor 2245 may arrange the view images in accordance with the arrangement determined by the control module 2290 and synthesize the arranged view images, and the display module 2250 may control the interval between the display panel and the filter and display the synthesized view images on the controlled display panel.

According to one embodiment, at the step S240, the control module 2290 may determine arrangement of lens or barrier of the filter on the basis of the distance d and the length of the dead zone. At the step S250, the control module 2290 may control a location of the lens or barrier of the filter so that the lens or barrier of the filter may be arranged in accordance with the determined arrangement.

The apparatus for processing a three-dimensional image and the method for controlling the same according to the present invention are not limited to the aforementioned embodiments, and all or some of the aforementioned embodiments may selectively be configured in combination so that various modifications may be made in the aforementioned embodiments.

In the meantime, the method for controlling the apparatus for processing a three-dimensional image according to the present invention may be implemented in a recording medium, which can be read by a processor provided in the network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

In the three-dimensional image processing apparatus and the method for controlling a location of a sweet spot for displaying a multi-view image according to the present invention, since the locations of the plurality of users are detected and the location of the sweet spot is controlled on the basis of the distance between the detected users and the length of the dead zone of the multi-view image, the sweet spot zone may be controlled to correspond to the locations of the users who watch the three-dimensional images, whereby the plurality of users may watch the three-dimensional images at their desired locations without separate movement.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for controlling a location of a sweet spot for displaying a three-dimensional image using a multi-view image including a plurality of view images, the method comprising:
   detecting a plurality of users from an image obtained by taking a watching zone and acquiring user location information indicating locations of the plurality of detected users;
   calculating distance information indicating a distance between the detected users by using the acquired user location information; and
   controlling the location and a size of the sweet spot based on the calculated distance information and a length of a dead zone of the multi-view image by controlling a three-dimensional image pixel period and an interval between a display panel and a filter, including calculating the three-dimensional image pixel period based on the distance information and the length of the dead zone of the multi-view image,
   wherein controlling the location and the size of the sweet spot is performed by arranging the dead zone of the multi-view image between the plurality of users such that a center of the dead zone is located at the center between two users among the plurality of users when the distance between the plurality of users is greater than the length of the dead zone of the multi-view image,
   wherein controlling the location and the size of the sweet spot is performed by arranging the plurality of users at the same sweet spot such that the sweet spot is located between two users among the plurality of users when the distance between the plurality of users is less than the length of the dead zone of the multi-view image, and
   wherein calculating the distance information is performed by moving an actual location of one of the plurality of users as much as the distance corresponding to a viewing zone, the viewing zone corresponding to sum of the dead zone and the sweet spot.

2. The method according to claim 1, wherein controlling the location and the size of the sweet spot includes:
   controlling arrangement of the plurality of view images based on the calculated three-dimensional image pixel period.

3. The method according to claim 1, wherein controlling the location and the size of the sweet spot includes:
   calculating interval information indicating the interval between the display panel and the filter based on the distance information and the length of the dead zone of the multi-view image; and
   controlling the interval between the display panel and the filter based on the calculated interval information.

4. The method according to claim 1, wherein controlling the location and the size of the sweet spot includes controlling at least one of a location of a lens and a barrier of a filter based on the distance information and the length of the dead zone of the multi-view image.

5. The method according to claim 1, wherein the calculating of the distance information includes:
   moving at least one of the plurality of users such that the distance between the plurality of users is smaller than a viewing zone when the distance between the plurality of users is greater than the viewing zone; and
   calculating distance information indicating a distance between the moved at least one of the plurality of users and another user.

6. The method according to claim 1, wherein moving the actual location of one of the plurality of users as much as the distance corresponding to the viewing zone is performed so that a distance between the plurality of users is smaller than the viewing zone.

7. The method according to claim 1, wherein moving the actual location of one of the plurality of users is performed as much as an integer multiple of a width of the viewing zone.

8. The method according to claim 1, wherein the view images are arranged on the basis of the center two users.

9. The method according to claim 1, wherein a location and a size of the viewing zone are controlled by adjusting a scale factor defined as a ratio of the controlled pixel period with respect to an original pixel period.

10. A three-dimensional image processing apparatus, the apparatus comprising:
    a receiver for receiving a multi-view image including a plurality of view images; and
    a controller for detecting a plurality of users from an image obtained by taking a watching zone, acquiring user location information indicating locations of the plurality of detected users, calculating distance information indicating a distance between the detected users by using the acquired user location information, and the controller for controlling a location and a size of a sweet spot for viewing the plurality of view images based on the calculated distance information and a length of a dead zone of the multi-view image by controlling a three-dimensional image pixel period and an interval between a display panel and a filter, wherein the controller controls the location of the sweet spot by arranging the at least one dead zone of the multi-view image between the plurality of detected users such that a center of the dead zone is located at the center between two users among the plurality of users when the distance between the plurality of detected users is greater than the length of the at least one dead zone of the multi-view image, wherein the controller controls the location of the sweet spot by arranging the plurality of detected users at the same sweet spot such that a center of the sweet spot is located between two users among the plurality of users when the distance between the plurality of detected users is less than the length of the at least one dead zone of the multi-view image, wherein the controller calculates the distance information of the plurality of users by moving an actual location of one of the plurality of users as much as the distance corresponding to a viewing zone, the viewing zone corresponding to sum of the dead zone and the sweet spot, and wherein the controller controls the location and the size of the sweet spot by calculating the three-dimensional image pixel period based on the distance information and the length of the dead zone of the multi-view image.

11. The apparatus according to claim 10, further comprising:
a display module for displaying the view images arranged under the control of the controller, wherein the display module includes:
the display panel for displaying the view images; and
the filter for controlling an optical path of the displayed view images.

12. The apparatus according to claim 10, wherein the controller controls the location and the size of the sweet spot by controlling arrangement of the plurality of view images based on the calculated three-dimensional image pixel period.

13. The apparatus according to claim 10, wherein the controller controls the location and the size of the sweet spot by calculating interval information indicating the interval between the display panel and the filter based on the distance information and the length of the dead zone of the multi-view image and controlling the interval between the display panel and the filter based on the calculated interval information.

14. The apparatus according to claim 10, wherein the controller controls the location and the size of the sweet spot by controlling at least one of a location of a lens or a barrier of a filter based on the distance information and the length of the dead zone of the multi-view image.

15. The apparatus according to claim 10, further comprising:
a graphic processor for arranging the plurality of view images under the control of the controller and synthesizing the arranged view images.

16. The apparatus according to claim 10, further comprising:
a camera for taking the watching zone.

17. The apparatus according to claim 10, wherein the distance information indicating a distance between the detected users is calculated by moving at least one of the plurality of users such that the distance between the plurality of users is smaller than a viewing zone when the distance between the plurality of users is greater than the viewing zone, and calculating distance information indicating a distance between the moved at least one of the plurality of users and another user.

18. The apparatus according to claim 10, wherein moving the actual location of one of the plurality of users as much as the distance corresponding to the viewing zone is performed so that a distance between the plurality of users is smaller than the viewing zone.

19. The apparatus according to claim 10, wherein moving the actual location of one of the plurality of users is performed as much as an integer multiple of a width of the viewing zone.

20. The apparatus according to claim 10, wherein a location and a size of the viewing zone are controlled by adjusting a scale factor defined as a ratio of the controlled pixel period with respect to an original pixel period.

* * * * *